US011972685B2

(12) United States Patent
Malczyk et al.

(10) Patent No.: US 11,972,685 B2
(45) Date of Patent: Apr. 30, 2024

(54) POLLUTION MANAGEMENT SYSTEMS AND METHODS

(71) Applicant: Ford Global Technologies, LLC, Dearborn, MI (US)

(72) Inventors: Andrew Malczyk, London (GB); Emily Jackson, Dartford (GB); Adrian Raisin, Walthamstow (GB)

(73) Assignee: Ford Global Technologies, LLC, Dearborn, MI (US)

( * ) Notice: Subject to any disclaimer, the term of this patent is extended or adjusted under 35 U.S.C. 154(b) by 319 days.

(21) Appl. No.: 16/912,672

(22) Filed: Jun. 25, 2020

(65) Prior Publication Data

US 2020/0410862 A1 Dec. 31, 2020

(30) Foreign Application Priority Data

Jun. 26, 2019 (EP) .................................... 19182624

(51) Int. Cl.
*G06Q 50/30* (2012.01)
*G08G 1/14* (2006.01)

(52) U.S. Cl.
CPC ............. *G08G 1/148* (2013.01); *G06Q 50/30* (2013.01); *G08G 1/149* (2013.01); *G06Q 2240/00* (2013.01)

(58) Field of Classification Search
CPC ........ G08G 1/148; G08G 1/149; G06Q 50/30; G06Q 2240/00
See application file for complete search history.

(56) References Cited

U.S. PATENT DOCUMENTS

| | | | | |
|---|---|---|---|---|
| 2008/0291054 | A1 | 11/2008 | Groft et al. | |
| 2009/0171566 | A1 | 7/2009 | Morimoto et al. | |
| 2011/0015934 | A1 | 1/2011 | Rowe et al. | |
| 2013/0191189 | A1 | 7/2013 | Aparicio et al. | |
| 2014/0046874 | A1 | 2/2014 | Greene et al. | |
| 2014/0089016 | A1 * | 3/2014 | Smullin | G06Q 10/02 705/5 |
| 2014/0122375 | A1 | 5/2014 | An et al. | |

(Continued)

OTHER PUBLICATIONS

Langbroek, Joram H.M., Joel P. Franklin, Yusak O. Susilo, "The effect of policy incentives on electric vehicle adoption", 2016, Energy Policy, vol. 94, pp. 94-103 (Year: 2016).*

(Continued)

*Primary Examiner* — Jeff Zimmerman
*Assistant Examiner* — Wayne S. Murray
(74) *Attorney, Agent, or Firm* — Brandon Hicks; Eversheds Sutherland (US) LLP

(57) ABSTRACT

A pollution management method is provided. The method comprises determining a target relating to a level of pollution in an area associated with one or more parking spaces; monitoring a level of pollution in the area; adjusting a parking policy of the one or more parking spaces based on a comparison between the target and the level of pollution, in order to incentivise or disincentivise parking in the area; monitoring vehicles parking in the area; and re-adjusting the parking policy according to the vehicles parking in the area in order to adjust the incentivise or disincentivise to parking in the area and thereby achieve the target relating to the level of pollution in the area.

17 Claims, 2 Drawing Sheets

(56) References Cited

U.S. PATENT DOCUMENTS

| | | | | |
|---|---|---|---|---|
| 2015/0221140 | A1* | 8/2015 | Eid | G06Q 40/12 705/13 |
| 2015/0294431 | A1* | 10/2015 | Fiorucci | G07B 15/02 705/13 |
| 2016/0189324 | A1* | 6/2016 | Eramian | H04W 4/40 705/13 |
| 2018/0052860 | A1* | 2/2018 | Hayes | H04W 4/40 |
| 2021/0019671 | A1* | 1/2021 | Cao | G06Q 30/0283 |

OTHER PUBLICATIONS

European Search Report, EP App. 19182624.7, dated Dec. 19, 2019 (10 pages).

* cited by examiner

POLLUTION MANAGEMENT SYSTEMS AND METHODS

CROSS-REFERENCE TO RELATED APPLICATIONS

The present disclosure claims priority to and the benefit of EP Application No. 19182624.7, filed Jun. 26, 2019, which is hereby incorporated by reference herein in its entirety.

FIELD

The present disclosure relates to pollution management methods and systems and is particularly, although not exclusive, concerned with a pollution management method for reducing pollution hot spots within an urban area.

BACKGROUND

In urban areas, such as city and town centres, there is an increasing pressure on the road network and on-street parking, due to additional demand from an increased number of vehicles on the roads and the repurposing of parts of the road network and on-street parking spaces for other uses, such as for bike and bus lanes and bike racks.

This increase in pressure on the road network has caused the average road speed in some urban areas to decrease, due to high levels of road congestion. Additionally, parking space occupancy levels, particularly in high demand areas, are often greater than desirable limits, causing drivers to 'circle' looking for spaces, further contributing to congestion on the road network.

It is therefore taking longer for vehicles to complete journeys in urban areas which is causing air quality problems due to increased aggregate emissions from vehicles operating within the urban areas.

Furthermore, there is often increased numbers of drivers and/or passengers wanting to travel to certain destinations at particular times of day. For example, for school drop offs and commuting. This can exaggerate the issues of road congestion and parking space occupancy on a smaller level leading to hotspot areas, within the larger urban area, which, at certain times of day, experience large spikes in congestion and parking space occupancy levels in turn causing spikes in pollution levels within the hotspot area.

Current solutions have been to implement reduced speed limits in areas of high congestion in order to smooth traffic within the areas, to introduce pedestrianised zones to restrict access to potential hotspot areas and to control parking zones to manage where drivers park.

However, such measures are inflexible and may not remain suitable as road conditions vary during the day or over a week, month or year. Furthermore, there is limited data available on which to base what rules should affect which areas, and few methods to track the success of such measures.

As a result, authorities have been unable to deal with the complexity of the problem of increasing congestion and parking occupancy, and reducing air quality.

SUMMARY

According to an aspect of the present disclosure, there is provided a pollution management method, e.g. for a parking management controller controlling parking within an area, e.g. of a road network, the method comprising:

determining a target relating to a level of pollution, e.g. air pollution, in an area associated with one or more parking spaces;

monitoring the level of pollution in the area;

adjusting a parking policy of the one or more parking spaces based on a comparison between the target and the level of pollution, in order to incentivise or disincentivise parking in the area;

monitoring vehicles parking in the area, e.g. the number of vehicles parking, the duration that vehicles are parking and/or the range of times of day during which the vehicles parking; and re-adjusting the parking policy at least partially according to the vehicles parking in the area in order to adjust the incentivise or disincentivise to parking in the area and thereby achieve the target relating to the level of pollution in the area.

The parking may be controlled by the parking management controller on behalf of a local authority, e.g. a parking management authority.

The parking policy may define a variation in one or more parking rules over a period of time, e.g. over a day, a week, a month or a year. The parking rules may be, for example, the duration that vehicles are permitted to park, the range of times of day during which the vehicles are permitted to park, one or more restrictions on vehicles and/or vehicle occupants having, or not having, particular characteristics parking within the area.

For example, the parking policy may comprise a rule that only electric only vehicles are permitted to park in the area between particular hours of the day, e.g. between the hours of 8 am and 10 am and/or between 3 pm and 6 pm on a weekday. Alternatively, the parking policy may comprise a rule that only vehicles carrying a predetermined number of occupants, such as two or more, are permitted to park within the area at a particular time. Alternatively again, the parking policy may comprise a rule that vehicles having an emissions value greater than a predetermined value, e.g. a $CO_2$ emission of greater than 100 g/km, can only park for a predetermined maximum duration, such as 30 minutes within the area.

Additionally or alternatively, the parking policy may be re-adjusted based on a further comparison between the target and the level of pollution, e.g. made following a period of time after the parking policy has been adjusted.

The steps of monitoring the level of pollution within the area and/or monitoring the vehicles parking in the area, and re-adjusting the parking policy may be repeated, e.g. iteratively, such that the level of pollution converges on the target.

The method may comprise determining an individualised parking rule for a vehicle that may park within the area. The individualised parking rule may be determined according to the parking policy and one or more characteristics of the vehicle and/or occupants of the vehicle, and optionally the time of day or date when the vehicle may be parking and/or a destination of the occupants of the vehicle.

The individualised parking rule may be determined by the parking management controller remote from the vehicle. Alternatively, the individualised parking rule may be determined by a vehicle parking controller provided on the vehicle.

The individualised parking rule may comprise a maximum parking duration for a particular vehicle or particular occupants and/or a range of times of day at which the particular vehicle or occupants are permitted to park in the area. The individualised parking rule may comprise a restriction on the vehicle or occupants parking within the area, e.g. at a particular time or range of times.

The method may further comprise communicating the parking policy and/or the individualised parking rule to the vehicle prior to the vehicle parking in one of the parking spaces.

The method may comprise receiving identifying information from the vehicle. The identifying information may identify the vehicle and/or the occupants of the vehicle. The method may further comprise using the identifying information to look-up one or more characteristics of the vehicle or occupants in a database.

The characteristics of the vehicle and/or occupants may comprise one or more of a size, e.g. length and/or weight of the vehicle, emissions standards of vehicle, number of seats of the vehicle, electric-only operating capability of the vehicle, number of occupants, age of occupants, destination of the occupants and information relating to parking permits held by the occupants.

The database may be an external database, e.g. external to the parking management authority, maintained by an external authority, such as a government department or vehicle licencing authority. The database may be stored in a memory remote from the parking management controller. Looking up the one or more characteristics may comprise querying the external database using the identifying information and receiving the characteristics from the external database.

Additionally or alternatively, the method may comprise receiving information from the vehicle comprising one or more characteristics of the vehicle or occupants. The characteristics received from the vehicle may be verified against the information from the database before or after the vehicle has parked, e.g. prior to re-adjusting the parking policy.

The method may comprise monitoring one or more characteristics of the vehicles and/or occupants of the vehicles parking within the area. The parking policy may be re-adjusted at least partially according to the characteristics of the vehicles and/or occupants, in order to achieve the target relating to the level of pollution in the area. The parking policy may be re-adjusted using a machine learning algorithm utilising historical information relating the level of pollution within the area, the characteristics of vehicles and/or occupants parking, and determining not to park, within the area at particular times and the parking policy.

Adjusting the parking policy may comprise adjusting a maximum parking duration, adjusting a range of times of day during which parking within the parking spaces is permitted and/or adjusting one or more restrictions on vehicles parking, e.g. for vehicles and/or occupants having particular characteristics. The maximum parking duration may vary according to the time of day.

Monitoring the pollution level within the area may comprise measuring one or more of: vehicle density, vehicle speed, vehicle queue length, parking space utilisation and/or a concentration of one or more of carbon dioxide, nitrogen dioxide, ozone and particulate matter, such as particular matter having a diameter of less than or equal to 10 micrometres (PM10) or less than or equal to 2.5 micrometres (PM2.5), at one or more locations within the area at one or more times of day. Monitoring the pollution level may further comprise modelling a pollution level at one or more further times of day and/or in one or more further locations within the area based on the measured values.

The steps of measuring and modelling may be repeated, e.g. prior to repeating the step of re-adjusting the parking policy or making a further comparison between the level of pollution and the target.

The method may comprise autonomously operating one or more vehicles to park within the area and/or outside of the area based on the parking policy and/or the parking rule(s). For example, controllers for autonomously controlling the operation of the respective vehicles may determine whether to park within the area or a different area based on the parking policy. The controllers for autonomously controlling the operation of the respective vehicles may control the operation of the respective vehicles to park in the area or outside of the area.

According to another aspect of the present disclosure, there is provided a pollution management method, the method comprising:

- determining a target relating to a level of pollution in an area associated with one or more parking spaces;
- monitoring a level of pollution in the area;
- comparing the level of pollution to the target;
- adjusting a parking policy of the one or more parking spaces based on the comparison, in order to incentivise or disincentivise parking in the area and thereby achieve the target relating to pollution in the area.

According to another aspect of the present disclosure, there is provided a parking management method, e.g. for a parking management controller controlling parking within an area, e.g. of a road network, the method comprising:

- determining a target relating to the operation of vehicles within an area associated with one or more parking spaces, such as a pollution, congestion, queuing and or parking space occupancy target;
- monitoring an indicator value indicative of compliance with the target, e.g. by the vehicles within the area;
- adjusting a parking policy of the one or more parking spaces based on a comparison between the target and the indicator value, in order to incentivise or disincentivise parking in the area;
- monitoring vehicles parking in the area, e.g. the number of vehicles parking, the duration that vehicles are parking and/or the range of times of day during which the vehicles parking; and
- re-adjusting the parking policy at least partially according to the vehicles parking in the area in order to adjust the incentivise or disincentivise to parking in the area and thereby achieve the target.

According to another aspect of the disclosure, there is provided a pollution management system for managing the parking of vehicles within an area e.g. of a road network, and thereby controlling pollution within the area. The system comprises:

- a parking management controller provided remotely from the vehicles, the parking management controller configured to:
  - determine a target relating to a level of pollution in an area associated with one or more parking spaces;
  - monitor a level of pollution in the area; and
  - adjust a parking policy of the one or more parking spaces based on a comparison between the target and the level of pollution, in order to incentivise or disincentivise parking in the area; and
- a vehicle parking controller provided on a vehicle that may park within the area, the vehicle parking controller configured to:
  - receive information relating to the parking policy from the parking management controller; and
  - communicate the information relating to the parking policy to an occupant of the vehicle; and/or autonomously operate the vehicle to park within the area and/or outside of the area based on the information relating to the parking policy.

The parking management controller may be configured to monitor vehicles parking in the area. The parking management controller may be further configured to re-adjust the parking policy according to the vehicles parking in the area, e.g. according to the characteristics of the vehicles and/or occupants of vehicles parking within the area, in order to adjust the incentive or disincentive to parking in the area, and thereby achieve the target relating to the level of pollution in the area.

The vehicle parking controller may be configured to transmit information identifying the vehicle and/or one or more occupants of the vehicle and/or information comprising one or more characteristics of the vehicle and/or occupants to the parking management controller, e.g. as part of a request or enquiry made by the vehicle parking controller about the parking policy or parking rules for parking in the area.

The parking management controller may be configured to determine one or more characterises of the vehicle and/or occupant based on the identifying information. The parking management controller may be configured to determine an individualised parking rule for the vehicle based on the parking policy and the characteristics of the vehicle and/or occupants. The parking management controller may transmit the individualised parking rule to the vehicle, e.g. prior to the vehicle parking within the area.

The vehicle parking controller may be configured to communicate the individualised parking rules to the occupant and/or may autonomously operate the vehicle to park within the area and/or outside of the area based on the individualised parking rules, and optionally, an input from the occupant.

According to another aspect of the disclosure, there is provided a parking management system for managing the parking of vehicles within an area e.g. of a road network, and thereby achieve a target relating to the operation of the vehicle within the area. The system comprises:

- a parking management controller provided remotely from the vehicles, the parking management controller configured to:
  - determine a target relating to the operation of vehicles within an area associated with one or more parking spaces, such as a pollution, congestion, queuing and or parking space occupancy target;
  - monitor an indicator value indicative of compliance with the target, e.g. by the vehicles within the area; and
  - adjust a parking policy of the one or more parking spaces based on a comparison between the target and the indicator value, in order to incentivise or disincentivise parking in the area; and
- a vehicle parking controller provided on a vehicle that may park within the area, the vehicle parking controller configured to:
  - receive information relating to the parking policy from the parking management controller; and
  - communicate the information relating to the parking policy to an occupant of the vehicle; and/or
  - autonomously operate the vehicle to park within the area and/or outside of the area based on the information relating to the parking policy.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention. In particular, features described in relation to the first-mention aspect may be combined with features of the other aspect and features described in relation to the third-mentioned aspect may be combined with the features of the other aspects.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION

Figure 1:
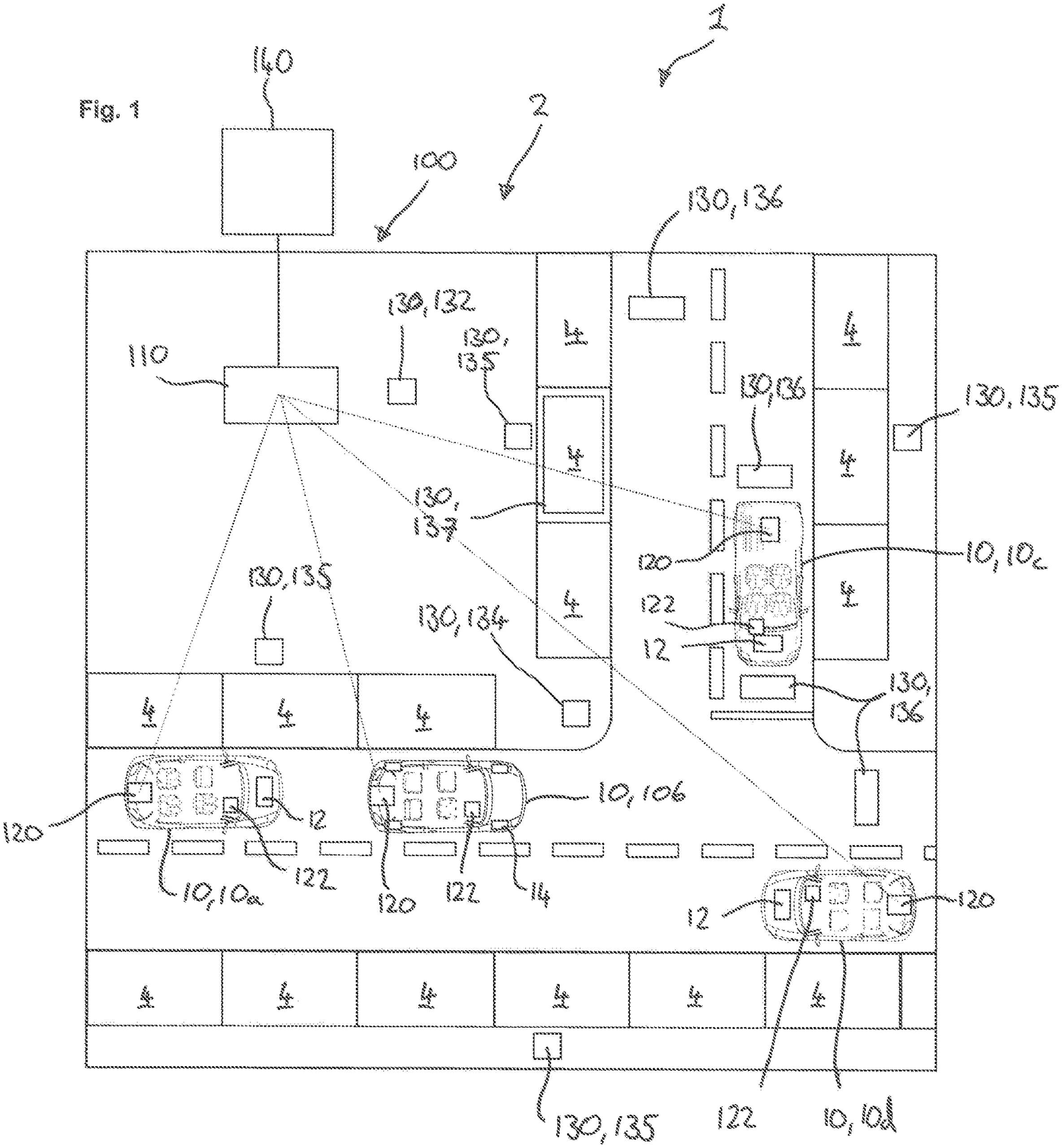
FIG. 1 is a schematic view of an area of a road network in which parking may be managed using a parking management system, according to arrangements of the present disclosure.

With reference to FIG. 1, a parking system 2, according to arrangements of the present disclosure, enables parking within an area 1 of a road network to be managed, e.g. in order to reduce and/or control congestion, parking occupancy and/or pollution within the area. As depicted, the parking system comprises an area 1 of the road network and a plurality of parking spaces 4 provided within the area.

The parking system 2 comprises a plurality of vehicles 10, which may park within the parking spaces 4. The vehicles 10 within the parking system 2 may comprise vehicles that are currently be located within the area 1 and/or may comprise one or more vehicles that are currently outside of the area.

Destinations of occupants within the vehicles 10, such as a place of work, school, shop or restaurant, may be closer to the area 1 of the road network than other areas of the road network. Accordingly, occupants within the vehicles 10 may be intending to park within the area 1 in order to reach their destinations. However, a decision about whether to park in one of the parking spaces 4 within the area 1 may be made, e.g. by the occupants, depending on a parking policy relating to parking within the parking spaces 4 in addition to availability of the parking spaces 4.

The parking policy may be set by a local authority, such as parking management authority, who may manage parking within the area 1 of the road network. The parking policy may comprise one or more parking rules and may define a variation in the parking rules over a period of time, such as over a day, a week, a month or a year. The parking rules may be, for example, a maximum duration that vehicles are permitted to park within the parking spaces 4 and/or a range of times of day during which the vehicles are permitted to park.

The parking rules may apply to each of the vehicles differently depending on one or more characteristics of the vehicle and/or the occupants of the vehicle. For example, the duration and/or the times of day or week that a particular vehicle is permitted to park, may vary depending on characteristics of the particular vehicle and/or its occupants.

Additionally or alternatively, the parking rules may further comprise one or more restrictions on parking within the area that apply to vehicles and/or vehicle occupants having, or not having, particular characteristics.

The characteristics of the vehicles and/or occupants that may affect the application of the parking rules may include, but are not limited to, vehicle size, e.g. length and/or weight of the vehicle, emissions standards of vehicle, such as a rate of emissions of one or more of carbon dioxide, carbon monoxide, nitrous oxides, particulate matter, such as particular matter having a diameter of less than or equal to 10 micrometres (PM10) or less than or equal to 2.5 micrometres (PM2.5), number of seats of the vehicle, electric-only operating capability of the vehicle, hybrid operating capability of the vehicle, number of occupants, age of occupants, destination of the occupants and parking permits held by the occupants, such as residential parking permits and disabled parking permits.

In one arrangement, the parking policy may comprise a rule that electric-only vehicles are permitted to park in the area at any time, and hybrid or non-hybrid vehicles comprising Internal Combustion Engines (ICEs) are not permitted to park between particular, predetermined hours of day, such as between the hours of 8 am and 10 am and/or between 3 pm and 6 pm on a weekday.

In FIG. 1, first, third and fourth vehicles 10*a*, 10*c*, 10*d* comprise ICEs 11. Hence, the first, third and fourth vehicles may not be permitted to park within the area between the predetermined hours of day.

Additionally or alternatively, the parking policy may comprise a rule that vehicles carrying fewer than two occupants are not permitted to park for longer than a first duration, such as 30 minutes, and vehicles carrying two or more occupants are permitted to park for a second duration, which may be greater that the first duration, e.g. 2 hours.

The second and fourth vehicles 10*b*, 10*d* depicted in FIG. 1 are carrying a single occupant, and hence, the second and fourth vehicles may be permitted to park for a maximum duration of 30 minutes, whilst the first and third vehicle may be permitted to park for a maximum duration of 2 hours within the area 1.

Additionally or alternatively again, the parking policy may comprise a rule which restricts vehicles having an emission rate, e.g. a rate of $CO_2$ emission, that is greater than a predetermined threshold, such as 100 g/km, from parking within the area 1.

The first, second and fourth vehicles 10*a*, 10*b*, 10*d* depicted in FIG. 1 have a rate of $CO_2$ production less than 100 g/km, and the third vehicle 10*c* may have an rate of $CO_2$ production greater than 100 g/km. Accordingly, the third vehicle may be restricted, e.g. prevented, from parking within the area 1 whilst the rule is in effect.

The parking system 2 further comprises a parking management system 100 for managing parking within the area 1, e.g. by setting the parking policy, and enabling the parking policy and/or parking rules to be communicated to the vehicles, and optionally, the occupants of the vehicles prior to the vehicles parking within the area.

The parking management system 100 thereby enables the vehicles, and optionally, the occupants of the vehicles to be made aware of the parking rules affecting parking within the area in order to make a decision about whether to park in the area 1 or in a different area of the road network to reach their destination.

In this way, the parking policy can be adjusted in order to influence the actions of vehicles with the area 1 and thereby affect congestion, parking space occupancy rates and the concentration and distribution of pollution within the area 1 and/or one or more further areas of the road network, e.g. within an urban area.

In particular, the parking policy for the area 1 may be adjusted in order to influence the actions of vehicles, in order to smooth variations in pollution within the urban area and/or to eliminate hotspots of increased pollution, e.g. within the area 1, occurring at a particular time of day, week, month and/or year. Due to its utility in managing the amount and distribution of pollution within the urban area, the parking management system 100 may be referred to as a pollution management system.

The parking management system 100 comprises a parking management controller 110 configured to manage the parking policy relating to the plurality of parking spaces 4 within the area 1.

The parking management controller 110 may be located remotely from the vehicles 10. In the arrangements depicted, the parking management controller 110 is located within the area 1. However, in other arrangements the parking management controller 110 may be located outside of the area 1. For example, the parking management controller 110 may be located in a central parking control centre. In some arrangements, the parking management controller 110 may be for managing parking within a plurality of areas of the road network at the same time, e.g. by managing a plurality of parking policies relating to the respective areas. Alternatively, the parking management controller may be dedicated to managing parking within the area 1.

The parking management system 100 further comprises one or more vehicle parking controllers 120. As depicted, the vehicle parking controllers 120 may be provided on the vehicles that may park within the area 1. The vehicle parking controllers 120 may be configured to communicate with the parking management controller 110 to receive information relating to the parking policy. Further, the vehicle parking controller 120 may be configured to communicate the information relating to the parking policy to occupants of the vehicle.

The vehicle parking controller 120 may be a dedicated vehicle parking controller. Alternatively, the functions of the vehicle parking controller 120 may be performed by another controller or one or more modules of one or more other controllers provided on the vehicle, e.g. as part of another system of the motor vehicle. For example, the vehicle parking controller 120 may be an engine control unit, a power train control unit, a navigation system controller or any other controller of the vehicle.

In some arrangements, functions of the vehicle parking controller 120 may be performed by a controller responsible for autonomously operating the vehicle. As described below, the vehicle parking controller 120 may operate the motor vehicle to park autonomously within the area 1, or a different area, at least partially based on the information received from the parking management controller 110.

The vehicles may further comprise a user interface device 122, such as a display screen, operatively connected to the vehicle parking controller 120 of the vehicle. Information relating to the parking policy may be communicated to the occupants of the vehicle via the user interface device 122.

Figure 2:
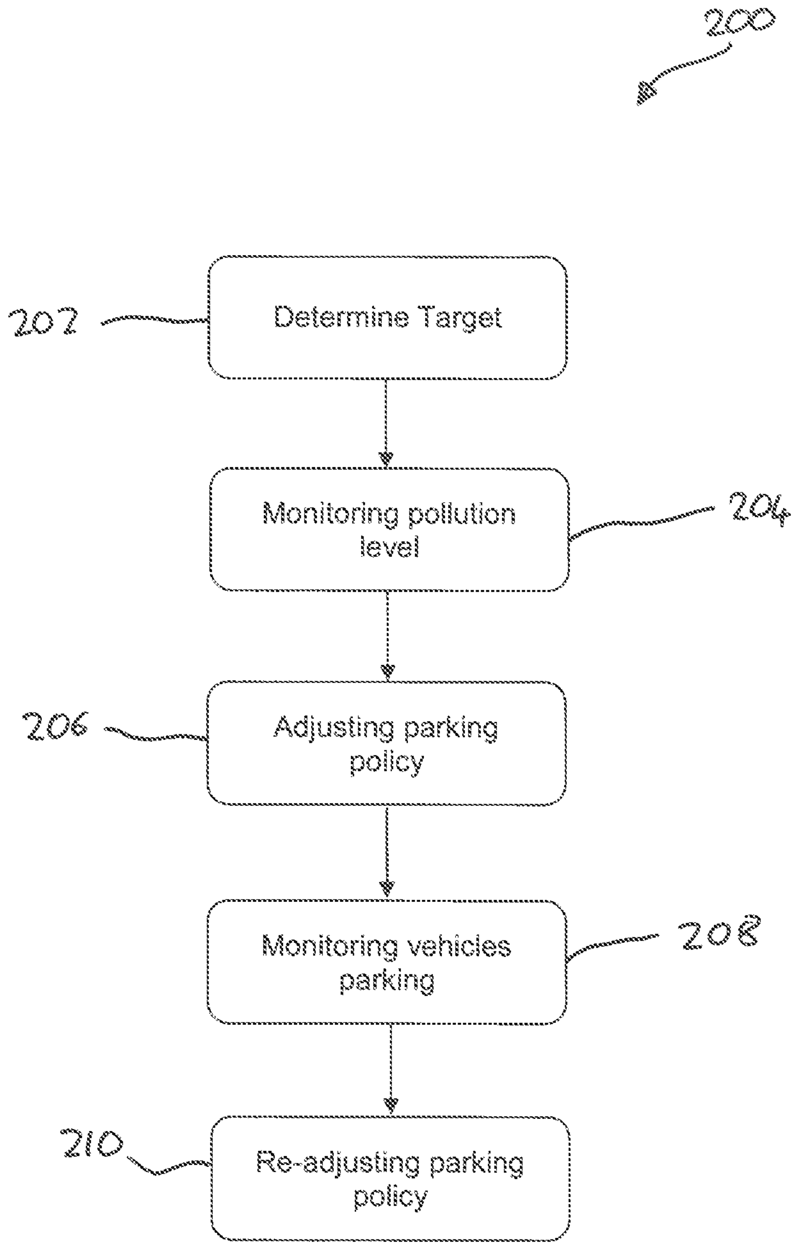
FIG. 2 is a flow chart illustrating a method for the parking management system according to arrangements of the present disclosure.

With reference to FIG. 2, the parking management system 100 may operate according to a parking management method 200. Steps of the parking management method 200 may be performed by the parking management controller 110 and/or by the vehicle parking controllers 120, as described below.

The parking management method 200 comprises a first step 202, in which one or more targets or objectives are determined relating to the area 1 or one or more portions of the area 1.

The targets or objectives may relate to vehicle congestion, e.g. specifying an average and/or maximum number of cars per km of road. Additionally or alternatively, the targets or objectives may relate to parking space occupancy, e.g. specifying a maximum desirable occupancy of parking spaces.

Additionally or alternatively again, in the first step 202 a target may be determined relating to a level of pollution, e.g. air pollution. For example, a target may be determined that defines a maximum and/or average amount or concentration of one or more pollutants, such as carbon dioxide, carbon monoxide, nitrous oxides, ozone and particulate matter, such as PM10 and PM2.5, permitted within the area or portion thereof. Additionally or alternatively, a target may be determined relating to a maximum and/or average amount of pollutants, such as those mentioned above, permitted to be emitted by vehicles within the area or a portion thereof over a predetermined period of time.

When the target or objective relates to a level of pollution, the parking management method 200 may be referred to as a pollution management method.

The target or objective may be set by the parking authority or by a local authority, e.g. a local government authority, or by a national authority, such as a government department of transport and/or environment.

The method comprises a second step 204, in which an indicator value, indicative of the compliance of the vehicles within the area with the target or objective is monitored. For example, when the target is a pollution target, the second step may comprise monitoring a level of pollution in the area or portion thereof.

The step of monitoring the indicator value, e.g. pollution level, may comprise taking one or more measurements, e.g. of pollutant concentration, traffic density, queue length and/or parking occupancy rates, at one or more locations within the area 1 at one or more times of day, week, month and/or year, and predicting a magnitude of the indicator value that is reflective of conditions in the location and/or one or more further locations within the area 1. Additionally or alternatively, the predicted magnitude of the indicator values may correspond to one or more times of the day, week, month and/or year other than those at which the measurements were taken.

In other words, the step of monitoring the indicator value may comprise generating a model providing, e.g. predicting, magnitudes of the indicator value across the area, or portion thereof, the model being based on one or more measurements, e.g. of pollutant concentration, traffic density, queue length and/or parking occupancy rate. The model may predict magnitudes of the indicator value over a period of time, such as a day, week, month or year, As depicted in FIG. 1, the parking management system 100 may comprise one or more sensors 130, such as pollutant sensors 132, traffic sensors, such as road cameras 134 and/or road pressure sensors 136, for determining traffic density and/or queue lengths and/or one or more parking occupancy sensors, such as parking space cameras 135 and/or parking space pressure sensors 137 for detecting cars located in parking spaces 4. Measurements from one, more than one or each of the sensors 130 may be taken in order to model, e.g. predict, a magnitude of the indicator value at a particular location within the area 1 at a particular time.

The second step 204 may be performed by the parking management controller 110.

The method 200 comprises a third step 206, in which a parking policy relating to the one or more parking spaces is adjusted based on a comparison between the target or objective and the indicator value. In particular, the parking policy may be adjusted in order to incentivise or disincentivise parking in the area, or portion thereof, with the aim of achieving the target or objective.

For example, if monitored pollution levels are greater than target pollution levels, the parking policy may be adjusted to reduce the duration that vehicles that are not capable of electric only operation are permitted to park within the area 1. This policy may reduce the number of occupants of vehicles with combustion engines wanting to park within the area 1, which may reduce pollution levels within the area.

The third step 206 may be performed by the parking management controller 110.

The parking management controller 110 may be configured to transmit the parking policy, e.g. the parking rules defined by the parking policy, to the vehicles 10 that may park within the area 1. In one arrangement, the parking management controller 110 may be configured to receive indications from the vehicles 10, e.g. from the vehicle parking controllers 120, indicating that the vehicles may park within the area 1. The parking management controller 110 may respond to the indications by transmitting the parking policy or parking rules to the vehicle parking controllers 120.

As described above, the parking rules that apply to a particular vehicle may depend on one or more characteristics of the vehicle and/or occupants within the vehicle. The parking management controller 110 may be configured to determine an individualised parking rule for a particular vehicle based on the characteristics of the vehicle and/or occupants together with the parking policy.

For example, the individualised parking rule may comprise a maximum parking duration that a particular vehicle or particular occupants are permitted to park in one of the parking spaces 4 within the area. Additionally or alternatively, the individualised parking rule may comprise a range of times of day at which the particular vehicle or occupants are permitted to park in the area. Additionally or alternatively again, the individualised parking rule may comprise a restriction on the particular vehicle or occupants parking within the area.

The parking policy may thereby be adjusted with the aim of discouraging vehicles having particular characteristics from travelling within the area 1. For example, if the objective or target is to reduce a level of emissions within the area, the adjustments to the parking policy may be intended to incentivise the parking of electric vehicles within the area and/or to disincentivise the parking of vehicles comprising combustion engine, within the area 1.

The vehicle parking controller 120 may be configured to transmit identifying information, identifying the vehicle and/or vehicle occupants, to the parking management controller 110. For example, the vehicle parking controller 120 may transmit the identifying information together with the indication that the vehicle may park within the area or in response to a request from the parking management controller to transmit the identifying information. The parking management controller 110 may be configured to look-up one or more characteristics of the vehicle 10 and/or vehicle occupants in a database using the identifying information.

As depicted in FIG. 1, a memory 140 in which the database is stored may be located remotely from the area 1. The database may be an external database maintained by an external authority. For example, the database may be maintained by a government department or vehicle licencing authority. Looking up the one or more characteristics may comprise querying the external database using the identifying information and receiving the characteristics from the external database.

In some arrangements, the vehicle parking controller 120 may be configured to transmit characteristics of the vehicle and/or occupants to the parking management controller 110 for the parking management controller to generate the individualised parking rule. In such arrangements, the parking management controller may verify the characteristics with the external database, e.g. prior to transmitting the individualised parking rule, prior to the vehicle parking or at a subsequent time.

The parking management controller 110 may transmit the individualized parking rule to the vehicle parking controller 120. In other arrangements, the vehicle parking controller 120 may generate the individualised parking rule based on the parking policy and characteristics of the vehicle, which may be stored in a memory accessible to the vehicle parking controller 120, e.g. provided on the vehicle. The vehicle parking controller 120 may communicate the individualised parking rule to the occupants, e.g. using the user interface device 122.

The method may further comprise a fourth step 208, in which vehicles parking in the area are monitored. For example, measurements from the sensors 130, such as the road and/or parking space cameras 134, 135, and/or the road and/or parking space pressure sensors 136, 137 may be taken to determine the number of vehicles parking within the area and/or travelling through the area without parking. Additionally or alternatively, the number of vehicles parking may be determined based on the identifying information and/or characteristics received at the parking management controller.

Monitoring the vehicles, e.g. in the fourth step 208, may comprise determining a magnitude of the indicator value based on the numbers of vehicle parking within and/or travelling through the area. For example, by updating the model predicting magnitudes of the indicator value across the area or portion thereof. Additionally or alternatively, one or measurement may be taken using the sensor 130, e.g. the pollutant sensors 132, in order to determine a magnitude of the indicator value following adjustment of the parking policy. Measurements from the sensors may be used to update the model.

The parking management controller 110 may be configured to monitor the characteristics of the vehicles parking in the area, and optionally, the vehicles that do not park within the area.

The parking management controller 110 may analyse the numbers and/or characteristics of the vehicles parking and/or not parking within the area 1 in order to determine a pattern or trend of the vehicles parking and/or not parking within the area 1. The parking management controller 110 may determine, based on the analysis, e.g. based on the resulting pattern or trend, whether the changes in the parking policy have had the desired effect on the vehicles parking and not parking within the area. The parking management controller 110 may compare the pattern of vehicle parking and/or not parking in the area to a desired pattern determined prior to the parking policy being adjusted.

The method 200 may comprise a fifth step 210 in which the parking policy is readjusted. The parking policy may be readjusted based on a further comparison between the indicator value and the target or objective, e.g. made after a predetermined time following the adjustment of the parking policy in the second step 204.

Additionally or alternatively, the parking policy may be readjusted according to the vehicles parking in the area, e.g. according to the monitoring performed in the fourth step 208. In either case, the parking policy may be readjusted in order to adjust the incentive or disincentive to parking in the area and thereby achieve the target or objective.

The parking policy may be readjusted, e.g. in the fifth step 210, based on changes in the pattern or trend of vehicles parking and/or not parking within the area, e.g. following a previous adjustment of the parking policy.

The steps of monitoring the vehicles and/or the magnitude of the indicator value, and readjusting the parking policy may be repeated, e.g. iteratively, in order to achieve the target or objective.

In some arrangements, the step of monitoring the vehicles and/or the magnitude of the indicator value, and readjusting the parking policy may be performed at least partially using a machine learning algorithm utilising historical information relating to the indicator value, e.g. the level of pollution within the area, the characteristics of vehicles and/or occupants parking, and determining not to park, within the area at particular times and the parking policy.

One or more of the vehicle may be autonomous vehicles capable of operating autonomously to park the vehicle within a desirable parking space. As disclosed above, the vehicle parking controller 120 may be a controller responsible for autonomously operating the motor vehicle, or a module thereof.

One or more of the vehicles may be configured to operate autonomously to park within the area 1, or outside of the area. The vehicle may determine where to park based on where is determined to be most convenient for the occupants. In particular, the controller for autonomously operating the vehicle may determine whether to park within the area 1 or outside of the area based on the information received from the parking management controller, e.g. based on the parking policy, parking rules and/or individualized parking rules.

The vehicle, e.g. the controller for autonomously operating the vehicle, may determine where to park based on the information from the parking management controller in addition to a destination of an occupant of the vehicle and a planned or predicted desirable parking duration, e.g. based on a length of an appointment of the occupants at the destination.

The vehicle parking controller 120 may be configured to communicate parking options to the occupants of the vehicle, e.g. via the user interface device 122, and may be configured to receive a parking selection from the occupants indicating the parking option that has been selected. The vehicle may then be controlled autonomously to park according to the selected parking option.

The following additional, numbered statements of invention are also included within the specification and form part of the present disclosure:

Statement 1. A pollution management method, the method comprising:

determining a target relating to a level of pollution in an area associated with one or more parking spaces;

monitoring the level of pollution in the area;

adjusting a parking policy of the one or more parking spaces based on a comparison between the target and the level of pollution, in order to incentivise or disincentivise parking in the area;

monitoring vehicles parking in the area; and re-adjusting the parking policy according to the vehicles parking in the area in order to adjust the incentivise or disincentivise to parking in the area and thereby achieve the target relating to the level of pollution in the area.

Statement 2. The method of statement 1, wherein the method comprises:

determining an individualised parking rule for a vehicle that may park within the area, wherein the individualised parking rule is determined according to the parking policy and one or more characteristics of the vehicle and/or occupants of the vehicle.

Statement 3. The method of statement 2, wherein the method further comprises communicating the individualised parking rule to the vehicle prior to the vehicle parking in one of the parking spaces.

Statement 4. The method of any of the preceding statements, wherein the method further comprises receiving identifying information from the vehicle, the identifying information identifying the vehicle and/or the occupants of the vehicle; and using the identifying information to look-up one or more characteristics of the vehicle or occupants in a database.

Statement 5. The method of statement 4, wherein the database is an external database maintained by an external authority, such as a government department or vehicle licencing authority.

Statement 6. The method of statement 4 or 5, wherein the individualised parking rule is determined based on the characteristics of the vehicle or occupants.

Statement 7. The method of any of the preceding statements, wherein the method further comprises, monitoring one or more characteristics of the vehicles and/or occupants of the vehicles parking within the area, wherein the parking policy is re-adjusted according to the characteristics of the vehicles and/or occupants, in order to achieve the target relating to the level of pollution in the area.

Statement 8. The method of any of the preceding statements, wherein adjusting the parking policy comprises adjusting a maximum parking duration, adjusting a range of times of day during which parking within the parking spaces is permitted and/or adjusting one or more restrictions on vehicles parking.

Statement 9. The method of any of the preceding statements, wherein monitoring the pollution level within the area comprises:

measuring one or more of: vehicle density, vehicle speed, vehicle queue length, parking space utilisation and/or a concentration of one or more of carbon dioxide, nitrogen dioxide, ozone, PM10 and PM2.5, at one or more locations within the area at one or more times of day; and modelling a pollution level at one or more further times of day and/or in one or more further locations within the area based on the measured values.

Statement 10. The method of any of the preceding statements, wherein the method further comprises:

autonomously operating one or more vehicles to park within the area and/or outside of the area based on the parking policy.

Statement 11. A parking management system for managing the parking of vehicles within an area, the system comprising:

a parking management controller provided remotely from the vehicles, the parking management controller configured to:

determine a target relating to a level of pollution in an area associated with one or more parking spaces;

monitor a level of pollution in the area; and adjust a parking policy of the one or more parking spaces based on a comparison between the target and the level of pollution, in order to incentivise or disincentivise parking in the area; and a vehicle parking controller provided on a vehicle that may park within the area, the vehicle parking controller configured to:

receive information relating to the parking policy from the parking management controller; and communicate the information relating to the parking policy to an occupant of the vehicle; and/or autonomously operate the vehicle to park within the area and/or outside of the area based on the information relating to the parking policy.

Statement 12. The parking management system of statement 11, wherein the parking management controller is configured to:

monitor vehicles parking in the area; and re-adjust the parking policy according to the vehicles parking in the area in order to adjust the incentive or disincentive to parking in the area, and thereby achieve the target relating to the level of pollution in the area.

Statement 13. The parking management system of statement 11 or 12, wherein the vehicle parking controller is configured to transmit:

information identifying the vehicle and/or one or more occupants of the vehicle; and/or information comprising one or more characteristics of the vehicle and/or occupants to the parking management controller.

Statement 14. The parking management system of statement 13, wherein the parking management system is configured to determine one or more characterises of the vehicle and/or occupant based on the identifying information.

Statement 15. The parking management system of statement 13 or 14, wherein the parking management controller is configured to:

determine an individualised parking rule for the vehicle based on the parking policy and the characteristics of the vehicle and/or occupants; and transmit the individualised parking rule to the vehicle.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

The invention claimed is:

1. A parking management system for managing the parking of vehicles within an area, the system comprising:

a parking management controller provided remotely from the vehicles, the parking management controller configured to:

determine a target relating to a level of pollution in an area associated with one or more parking spaces;

determine that a first level of pollution in the area is greater than or equal to the target; and adjust, via a machine learning algorithm utilizing historical information and one or more characteristics of the vehicles and occupants, and based on the determination that the first level of pollution is greater than or equal to the target, a parking policy of the one or more parking spaces in order to disincentivize parking in the area, wherein the parking policy includes one or more parking rules that restrict the vehicles and occupants that are allowed to park in the one or more parking spaces depending on whether the vehicles or occupants have or do not have the one or more characteristics;

monitor the one or more characteristics of the vehicles and/or the occupants of the vehicles parking within the area, wherein the parking policy is re-adjusted according to each of the one or more characteristics of the vehicles and/or the occupants in order to achieve the target relating to the level of pollution in the area, wherein the one or more characteristics of the vehicle and/or the occupants comprises a length and a weight of the vehicle, an emissions standards of the vehicle, a number of seats of the vehicle, an electric-only operating capability of the vehicle, a number of the occupants, an age of the occupants, a destination of the occupants, and information associated with parking permits held by the occupants; and a vehicle parking controller provided on a vehicle that may park within the area, the vehicle parking controller configured to:

receive information relating to the parking policy from the parking management controller;

determine a location to park the vehicle based on the parking policy information from the parking management controller, a destination of an occupant of the vehicle and a planned or predicted desirable parking duration; and autonomously operate the vehicle to park in the determined location.

2. The parking management system of claim 1, wherein the vehicle parking controller is configured to transmit:

information identifying the vehicle and/or one or more occupants of the vehicle; and/or information comprising the one or more characteristics of the vehicle and/or the occupants to the parking management controller.

3. The parking management system of claim 2, wherein the parking management system is configured to:

determine the one or more characteristics of the vehicle and/or the occupants based on the identifying information.

4. The parking management system of claim 3, wherein the parking management controller is configured to:

determine an individualized parking rule for the vehicle based on the parking policy and the one or more characteristics of the vehicle and/or the occupants, wherein the individualized parking rule comprises a maximum parking duration for the vehicle, a range of times of day that the vehicle may park in the area, and a restriction on the vehicle and/or the occupants parking in the area; and transmit the individualized parking rule to the vehicle.

5. The parking management system of claim 4, wherein the individualized parking rule is determined based on each of the one or more characteristics of the vehicle and/or the occupants.

6. The parking management system of claim 1, wherein the parking management controller is further configured to:

receive identifying information from the vehicle comprising each of the one or more characteristics of the vehicle and the occupants; and verify the characteristics received from the vehicle against information from a database prior to re-adjusting the parking policy.

7. The parking management system of claim 6, wherein the database is an external database maintained by an external authority, such as a government department or vehicle licensing authority.

8. The parking management system of claim 1, wherein monitoring the pollution level within the area comprises:

measuring vehicle density, vehicle speed, vehicle queue length, parking space utilization and a concentration of one or more of carbon dioxide, nitrogen dioxide, ozone, PM10 and PM2.5, at one or more locations within the area at one or more times of day; and modelling a pollution level at one or more further times of day and/or in one or more further locations within the area based on the measured values.

9. The parking management system of claim 1, wherein the parking management controller is further configured to:

determine that a second level of pollution in the area is less than or equal to the target; and adjust, via the machine learning algorithm utilizing the historical information and one or more characteristics of the vehicles and occupants, and based on the determination that the second level of pollution is less than or equal to the target, the parking policy, in order to incentivize parking in the area.

10. The parking management system of claim 9, wherein when the parking management controller determines that the second level of pollution in the area is less than or equal to the target, the parking management controller adjusts the parking rules to remove the one or more parking rules that restrict the vehicles and occupants that are allowed to park in the area to incentivize parking in the area.

11. The parking management system of claim 1, wherein responsive to the parking management controller determining that the first level of pollution in the area is greater than or equal to the target, the parking management controller adjusts the parking rules to include a rule where only electric vehicles may park in the area in order to disincentivize a pollution causing vehicle from parking in the area.

12. The parking management system of claim 11, wherein the parking management controller is further configured to receive identifying information from the vehicle comprising each of the one or more characteristics of the vehicle and the occupants, and verify each of the characteristics received from the vehicle against information from a database prior to re-adjusting the parking policy, and wherein the database is an external database maintained by a government department or vehicle licensing authority.

13. The parking management system of claim 1, wherein when the parking management controller determines that the first level of pollution in the area is greater than or equal to the target, the parking management controller adjusts the parking rules to include a rule where the vehicles may only park in the area during a specified time period in order to disincentivize a pollution causing vehicle from parking in the area.

14. The parking management system of claim 1, wherein when the parking management controller determines that the first level of pollution in the area is greater than or equal to the target, the parking management controller adjusts the parking rules to include a rule where the vehicles may only park in the area for a predetermined maximum duration in order to disincentivize a pollution causing vehicle from parking in the area.

15. The parking management system of claim 14, wherein when the parking management controller determines that the first level of pollution in the area is greater than or equal to the target, the parking management controller adjusts the parking rules to include a rule where vehicles having an emissions value greater than a predetermined value can only park in the area for the predetermined maximum duration in order to disincentivize the pollution causing vehicle from parking in the area.

16. The parking management system of claim 1, wherein when the parking management controller determines that the first level of pollution in the area is greater than or equal to the target, the parking management controller adjusts the parking rules to include a rule where only vehicles carrying a predetermined number of occupants may park in the area in order to disincentivize a pollution causing vehicle carrying a low number of occupants from parking in the area.

17. The parking management system of claim 1, wherein the parking management controller is disposed in one of a central parking control centre.

* * * * *